(12) United States Patent
Goh et al.

(10) Patent No.: US 11,506,956 B1
(45) Date of Patent: Nov. 22, 2022

(54) CYLINDRICAL CAMERA WITH INTEGRATED TILT STAND

(71) Applicant: Dell Products L.P., Round Rock, TX (US)

(72) Inventors: Peng Lip Goh, Singapore (SG); Celia Law, Singapore (SG); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 17/333,367

(22) Filed: May 28, 2021

(51) Int. Cl.
*G03B 17/56* (2021.01)
*F16M 11/18* (2006.01)

(52) U.S. Cl.
CPC ........... *G03B 17/561* (2013.01); *F16M 11/18* (2013.01)

(58) Field of Classification Search
CPC .......................... F16M 13/022; G03B 17/561
See application file for complete search history.

(56) References Cited

U.S. PATENT DOCUMENTS

| | | | |
|---|---|---|---|
| 6,738,094 B1 * | 5/2004 | Minami | H04N 7/142 |
| | | | 348/E5.025 |
| 7,202,903 B2 * | 4/2007 | Lin | F16M 13/022 |
| | | | 396/419 |
| 7,337,497 B2 | 3/2008 | Seidler et al. | |
| 7,572,073 B2 * | 8/2009 | Kenoyer | F16M 13/022 |
| | | | 396/428 |
| 7,612,825 B2 | 11/2009 | Silverbrook | |
| D618,266 S | 6/2010 | Imaeda | |
| 8,797,456 B2 * | 8/2014 | Liang | H04N 5/2251 |
| | | | 248/439 |
| 8,824,166 B2 | 9/2014 | Rohrbach | |
| 9,114,487 B2 * | 8/2015 | Kiple | G03F 1/38 |
| 9,169,962 B2 * | 10/2015 | Wang | F16M 11/14 |
| D761,340 S | 7/2016 | Pacurariu et al. | |
| D761,343 S | 7/2016 | Schmidt et al. | |
| 2007/0046031 A1 | 3/2007 | Goldenberg et al. | |
| 2007/0070205 A1 * | 3/2007 | Huang | F16M 11/10 |
| | | | 348/E5.026 |
| 2009/0101768 A1 | 4/2009 | Wert | |
| 2013/0163197 A1 | 6/2013 | Mack et al. | |
| 2017/0315596 A1 | 11/2017 | Torres et al. | |

FOREIGN PATENT DOCUMENTS

| | | | |
|---|---|---|---|
| JP | 2009139424 A | * | 6/2009 |
| JP | 2009278040 A | * | 11/2009 |
| JP | 2011077262 A | * | 4/2011 |
| WO | 2011087301 A1 | | 7/2011 |

OTHER PUBLICATIONS

Wikipedia, "iSight," downloaded from http://en.wikipedia.org/wiki/ISight on May 20, 2021, 4 pages.

* cited by examiner

Primary Examiner — Leon W Rhodes, Jr.
(74) Attorney, Agent, or Firm — Zagorin Cave LLP; Robert W. Holland

(57) ABSTRACT

An information handling system peripheral camera is built in a cylindrical housing, such as an extruded aluminum cylinder, having a bottom portion rotationally coupled to an upper portion by a hinge to act as a bracket that couples the peripheral camera to a display upper surface. A bracket disposed in the housing and exposed by rotation of the bottom portion to an open position rests on the display upper surface to rotate for varied camera tilt. The bottom portion leverages against a rear surface of the display to hold the camera in position.

19 Claims, 5 Drawing Sheets

CYLINDRICAL CAMERA WITH INTEGRATED TILT STAND

BACKGROUND OF THE INVENTION

Field of the Invention

The present invention relates in general to the information handling system cameras, and more particularly to an information handling system cylindrical camera with integrated tilt stand.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with peripheral devices, such as keyboards, mice and cameras. Cameras are typically used to support videoconferences in which visual images captured by cameras are exchanged so that end users can communicate while viewing each other. Typically, videoconferences are performed with cameras that have relatively low resolution. The use of low resolution is driven in part by the amount of bandwidth consumed by communication of video information. In addition, low resolution is driven by the footprint of typical Web cameras, which generally do not have the size to support high quality lenses. For example, cameras integrated in portable information handling systems tend to have a restricted focal length due to the thickness of typical portable information handling system housings. Peripheral Web cameras typically have a larger footprint so that higher quality lenses may be included that capture higher resolution visual images than integrated cameras. Generally, even with larger housing footprints, Web cameras tend to limit resolution to High Definition visual images as Ultra High Definition or 4K cameras have large bandwidth demands.

Recently, enterprises have experienced an increased reliance on videoconferences to interact internally between employees and externally with customers and vendors. Although lower resolution Web cameras are sufficient for many daily uses, in many situations, higher quality video images are desired. For instance, in conferences that involve senior executives or high government officials, higher resolution video images are generally desired. Often, such high level conferences are done from large conference rooms and involve a number of participants. Generally, high resolution cameras with high quality lenses offer a number of advantages in such scenarios. One advantage is that greater focal length will allow one camera to provide high quality video images at different ranges through zoom functionality. Another advantage is that higher resolution offers greater flexibility for digital zoom, pan and tilt functions, such as by cropping an image to capture a participant with a close-up view. When a camera provides higher resolution visual images, a number of additional integrated functions may be provided at the camera, such as artificial intelligence analysis that aids with facial recognition and gesture inputs. For example, processing resources added to the camera monitor visual information for desired attributes that are reported to the information handling system, such as an end user's identity.

One difficulty with including higher resolution capability in a peripheral Web camera is that additional interior room generally needed for higher resolution and greater integrated intelligence can result in awkward form factors with unsatisfactory aesthetics, particularly when used in high profile video conferences. Further, a peripheral Web camera generally is placed proximate an information handling system display so that an awkward form factor may need specialized brackets to couple to a display or stand. For instance, a peripheral Web camera is typically coupled to a top side of a peripheral display and directed towards an area in front of the display where an end user views the display. Often peripheral displays are built to have a minimal bezel width and weight so that coupling a camera to the peripheral display can require a specialized bracket and assembly.

SUMMARY OF THE INVENTION

Therefore, a need has arisen for a system and method which integrates a display bracket in a peripheral camera.

In accordance with the present invention, a system and method are provided which substantially reduce the disadvantages and problems associated with previous methods and systems for coupling a peripheral camera to a display. A peripheral camera cylindrical housing bottom portion rotates open to act as a bracket that couples the peripheral camera to a peripheral display upper surface.

More specifically, an information handling system having a processor and memory interfaces with a peripheral camera that captures visual images to support video conferences. The peripheral camera assembles into a cylindrical housing with a subassembly holding a camera module and circuit board in place. For example, the cylindrical housing is manufactured with extruded aluminum having open front and rear faces. A bottom portion is cut from the cylindrical housing, such as from a central bottom location so that the upper portion has a full circumference at the front and rear faces, and then coupled with a hinge to rotate between open and closed positions. In the open position, the bottom portion exposes an L-bracket within the cylindrical housing interior that rests on a peripheral display upper surface. A biasing device, such as a spring interfaced with the hinge, biases the bottom portion against the peripheral display rear side to hold the peripheral camera in place at the upper side of the peripheral display. The L-bracket rotationally couples with an axle at the upper portion interior to provide tilt adjustment of the camera at the peripheral display upper surface.

The present invention provides a number of important technical advantages. One example of an important technical advantage is that a peripheral camera integrates in a cylindrical housing having a portion that rotates open and closed to provide a bracket that couples the camera to a peripheral display upper surface. The integrated bracket machined as a hinged door from an extruded aluminum housing does not add substantial weight or displeasing aesthetics to the camera and provides a ready bracket for coupling to a peripheral display. An internal L-bracket rotationally couples in the cylindrical housing interior to provide camera tilt with a robust surface contact established at the peripheral display upper surface. A coupling device, such as integrated threads or a magnet, is disposed in the cylindrical housing bottom portion to couple to a stand, such as a tripod, when the bottom portion is in a closed position.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system peripheral camera housing of extruded aluminum supports a camera module with an integrated bracket machined from the housing to couple to a peripheral display when the bracket rotates to an open position. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
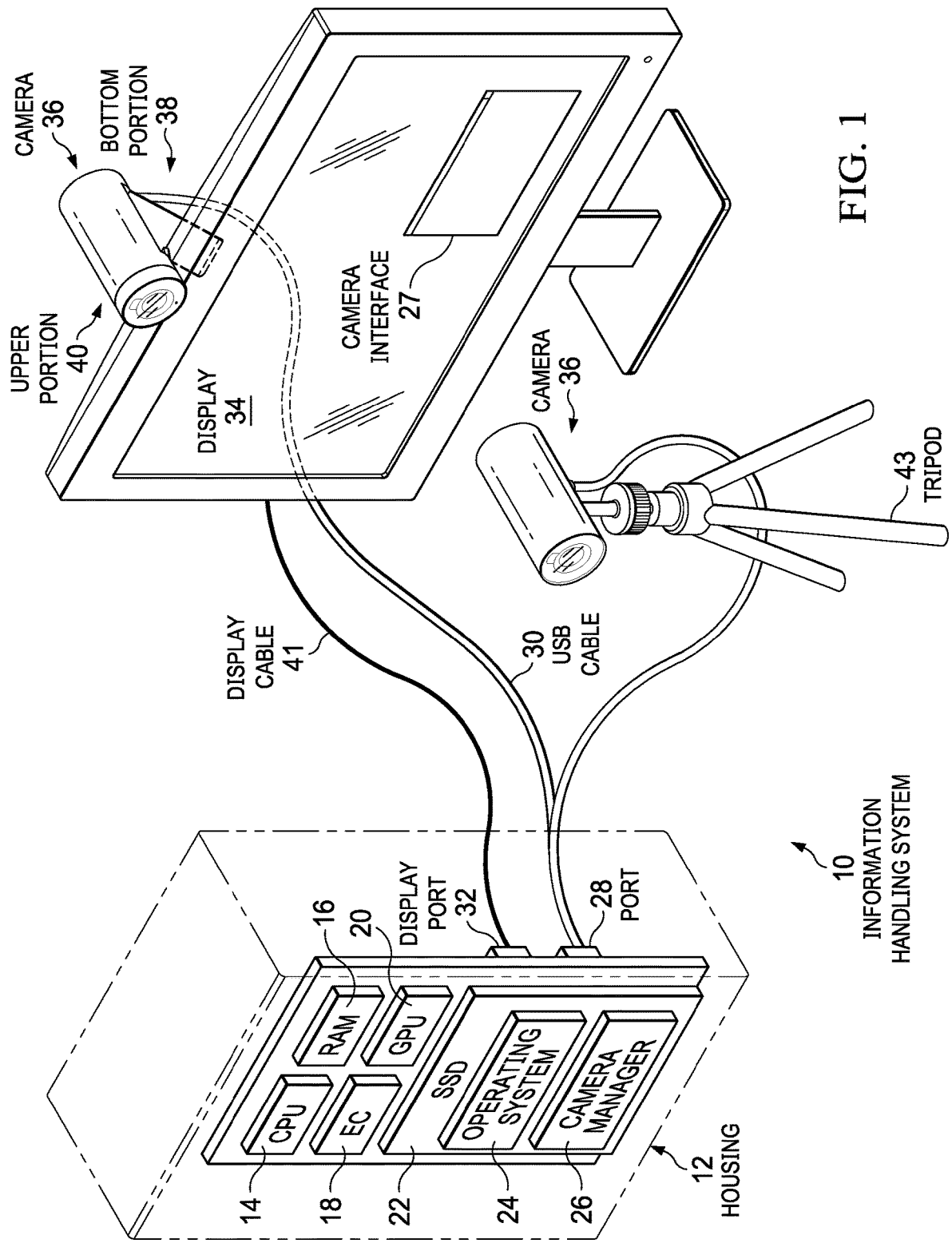
FIG. 1 depicts a block diagram of an information handling system interfaced with a peripheral camera that supports videoconferencing.

Referring now to FIG. 1, a block diagram depicts an information handling system 10 interfaced with a peripheral camera 36 that supports videoconferencing. In the example embodiment, information handling system 10 processes information with processing components disposed in a housing 12. For example, a central processing unit (CPU) 14 executes instructions that process information with the instructions and information stored in a random access memory (RAM) 16. An embedded controller 18 manages physical operating conditions within housing 12, such as application of power and maintaining thermal constraints, and also manages interactions with peripheral devices, such as a keyboard and mouse. A graphics processing unit (GPU) 20 interfaces with CPU 14 and further processes the information to generate visual images, such as by generating pixel values that define pixel colors for presentation at display 34. A solid state drive (SSD) 22 provides non-transitory memory, such as flash, that stores information during system power down states. For example, the instructions may include an operating system 24 stored in SSD 22 and retrieved to RAM 16 with boot code executed on embedded controller 18 at system power up.

GPU 20 interfaces through a display port 32 and display cable 41 with a display 34 that presents information as visual images, such as by scanning pixel values to a display panel having rows and columns of pixels. In the example embodiment, a first peripheral camera 36 is illustrated in two different positions relative to display 34. A housing bottom portion 38 rotates to an open position to couple camera 36 to an upper side of display 34 to capture visual images of an end user viewing display 34. A second peripheral camera 36 rests on a tripod 43 to capture visual images of an end user viewing the display from a location in between the end user and the display. Multiple viewing locations for camera 36 provides an end user with increased flexibility regarding the quality of a visual image captured by camera 34. As is described below in greater detail, camera 36 may selectively detach and attach from each of display 34 upper surface and tripod 43 by adjusting the position of housing bottom portion 38 relative to housing upper portion 40. When bottom portion 38 opens in a door-like manner relative to upper portion 40, it supports direct attachment of camera 36 to display 34. When housing bottom portion 38 shuts to a closed position, a coupling device in the bottom surface couples to tripod 43. Camera 36 captures visual images and communicates the visual images through a USB cable 30 and to a USB port 28 for use by information handling system 10, such as to support a videoconference. In the example embodiment, a camera manager 26, such as driver of operating system 24, provides a camera interface 27 for presentation at display 34 to manage camera settings and present visual images captured by camera 36.

Figure 2A:
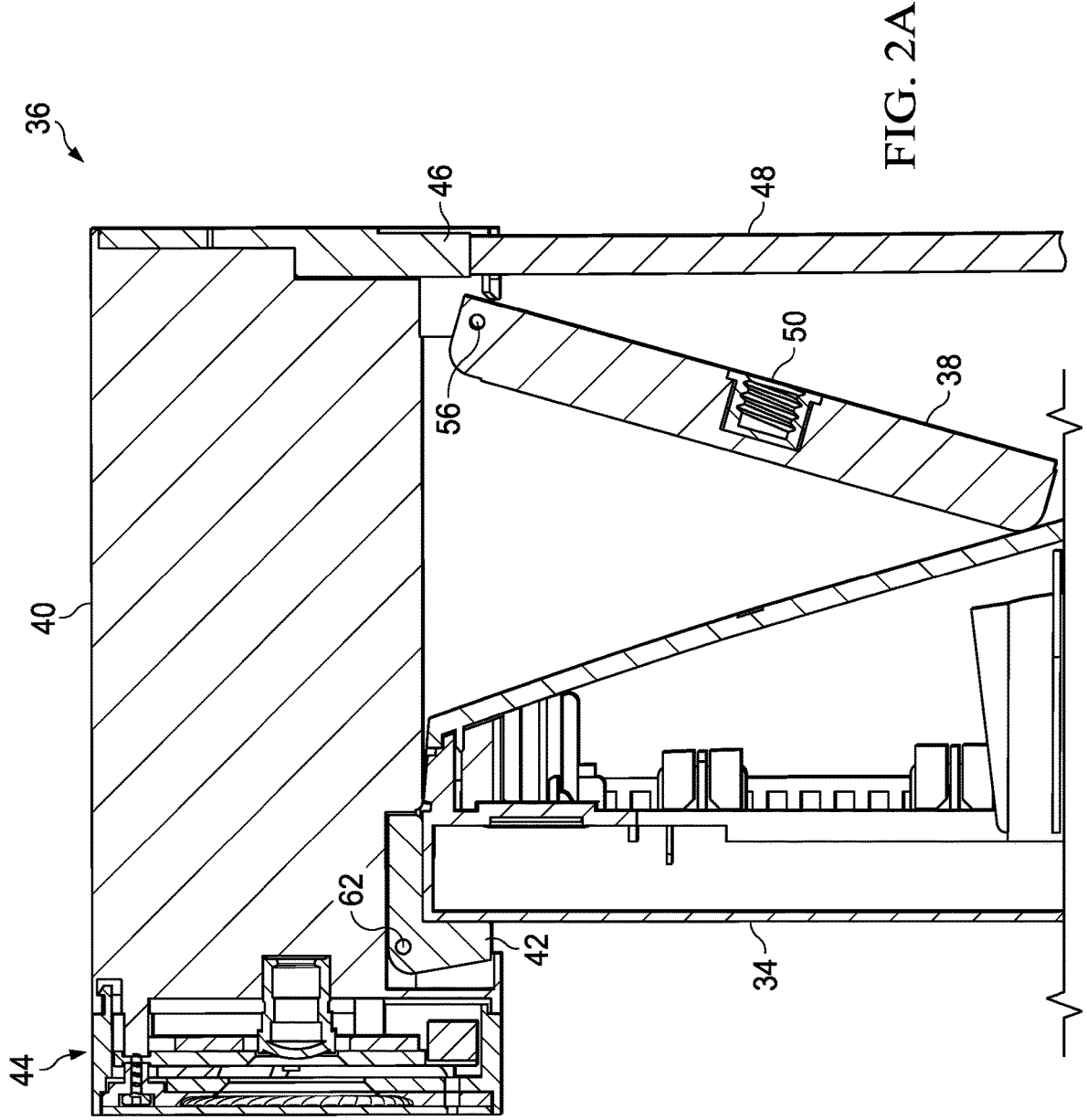
FIGS. 2A and 2B depict a camera bottom portion holding the camera in position with tilt provided by a rotationally coupled bracket in the camera interior that rests on the display upper surface.
Figure 2B:
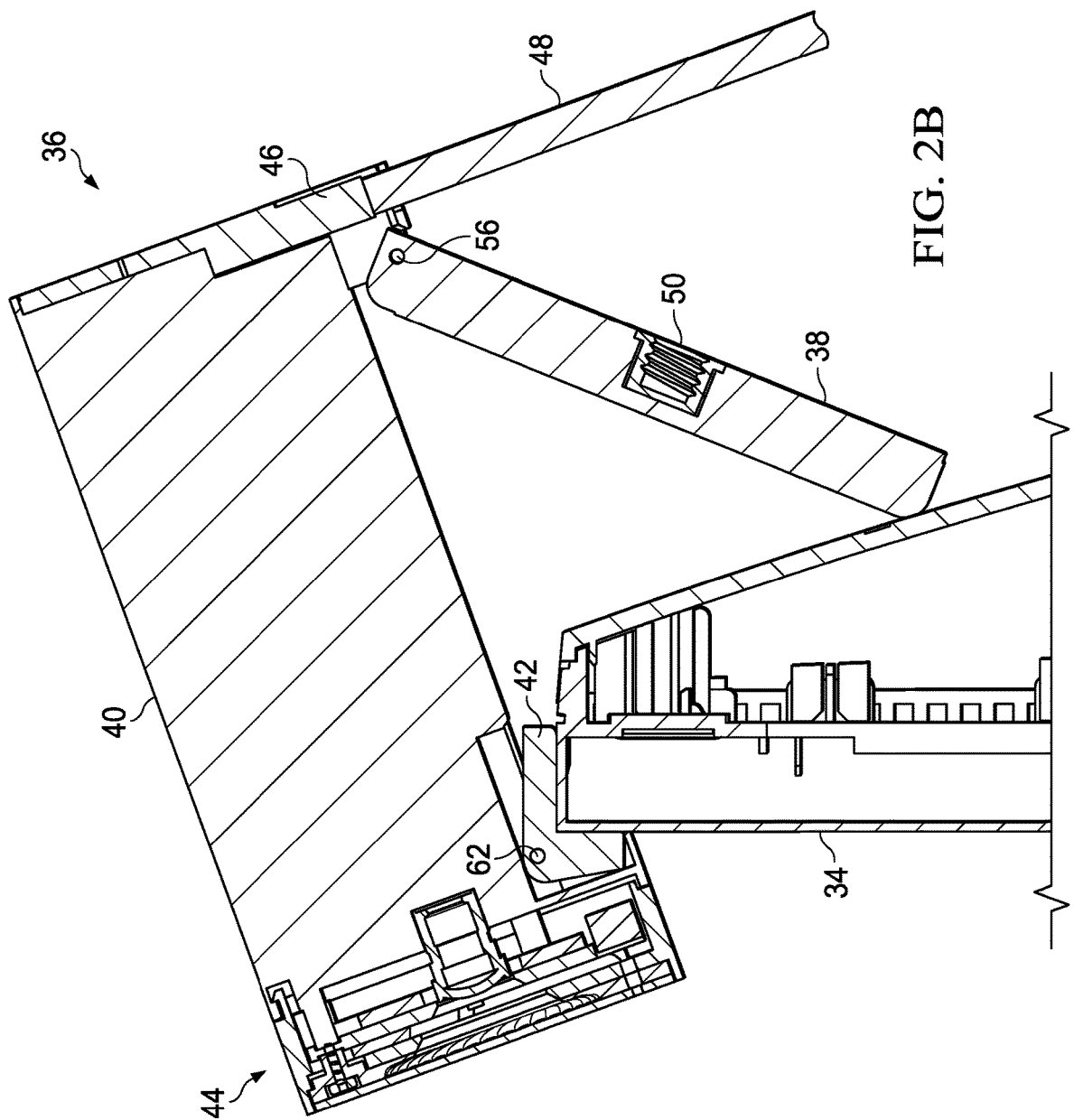

Referring now to FIGS. 2A and 2B, a camera 36 bottom portion 38 is depicted holding the camera in position with tilt provided by a rotationally coupled bracket 42 in the camera interior that rests on the display 34 upper surface. FIG. 2A depicts camera 36 held normal to the display panel surface of display 34. Bottom portion 38 rotates about hinge 56 to approximately 90 degrees open relative to upper portion 40 to rest against a rear surface of display 34. For example, hinge 56 includes a spring or other biasing device that biases bottom portion 38 towards a closed position against upper portion 40. When rotated open, bottom portion 38 exposes an interior of camera 36 in which an L-shaped bracket 42 is disposed at the front side of the opening of camera 36 defined in upper portion 40 by bottom portion 38. Bracket 42 rests on the upper surface corner of display 34 with the bias of bottom portion 38 pulling bracket 42 against the front side of display 34 for a robust coupling in position. In the example embodiment, upper portion 40 has a full circumference at a front face where a camera module 44 couples and a rear face where a communication port 46 couples to a cable 48, such as a USB cable. In the example embodiment, a threaded coupling device 50 integrates in bottom portion 38 to attach to a screw extending from a tripod or other stand. In an alternative embodiment, a magnetic coupling device may be used as described in greater detail in U.S. patent application Ser. No. 17/325,503, filed May 20, 2021, by Inventors Celia Law, et al., which is incorporated herein as if fully set forth. FIG. 2B depicts camera 36 having a downward tilt viewing angle provided by a change in the orientation of bracket 42 relative to upper portion 40. Bracket 42 couples to an interior of upper portion 40 with an axle 62 to provide rotation. Bottom portion 38 closes somewhat relative to upper portion 40 to rest against the back of display 34 at a higher position, resulting in a downward tilt of upper portion 40 while bracket 42 remains robustly engaged at the display upper surface.

Figure 3:
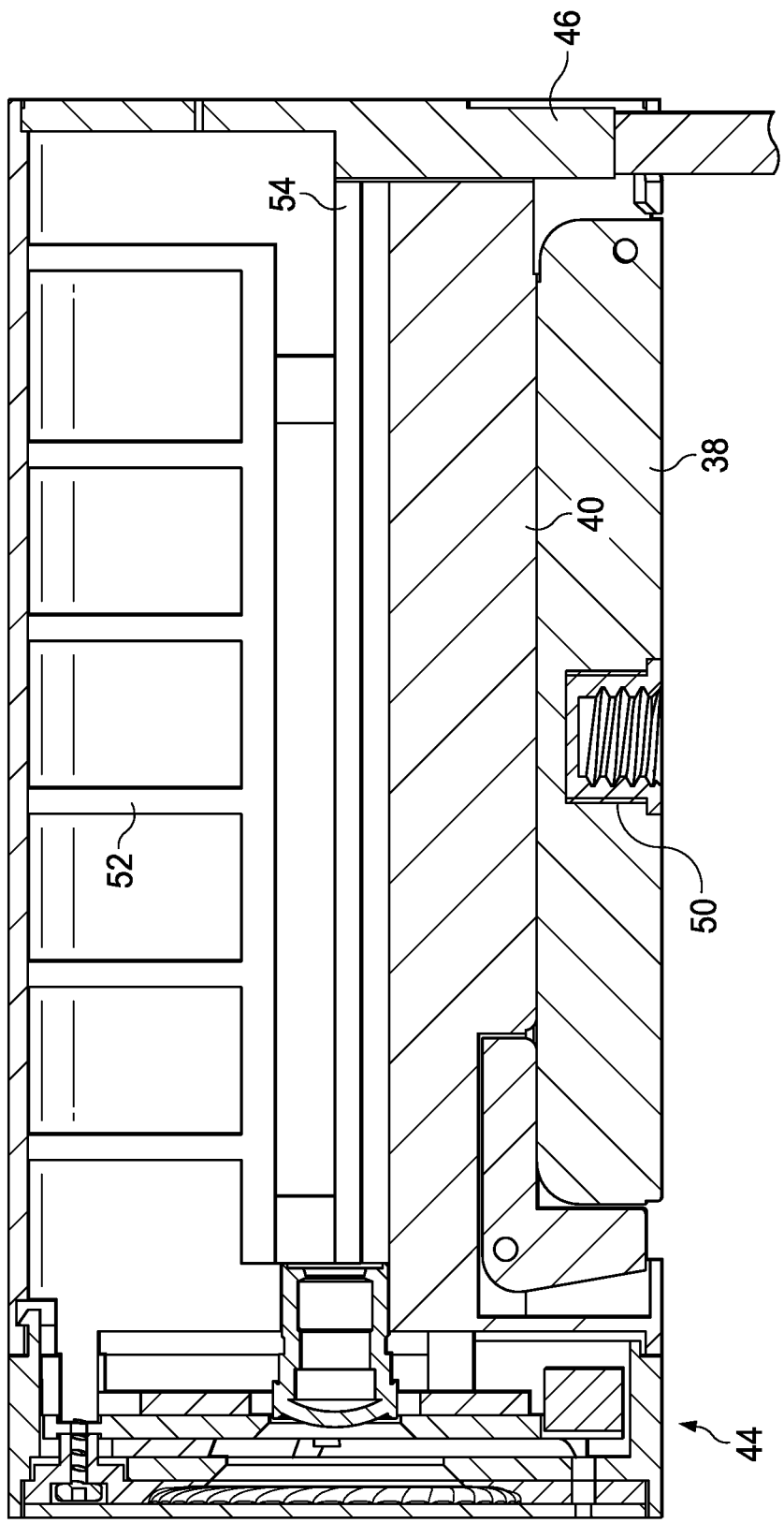
FIG. 3 depicts the peripheral camera cylindrical housing with a cross sectional view.

Referring now to FIG. 3, a cross-sectional view of peripheral camera 36 depicts an interior subassembly and components. In the example embodiment, camera 36 is manufactured by extrusion of aluminum to form a cylinder that is then machined to cut bottom portion 38 from upper portion 40. In the example embodiment, bottom portion 38 is cut from a middle section of the cylinder so that each end of upper portion 40 has a full circumference. At a front face of the cylinder within the full circumference, a camera module couples in place to a subassembly 52. At a rear face of the cylinder within the full circumference, a communications port 46 couples to accept a communication cable from an information handling system. A main circuit board 54 couples to subassembly 52 to interface camera module 44 with communications port 46. In addition, main circuit board 54 may support processing resources that process visual information, such as for facial identification. The example embodiment depicts bottom portion 38 rotated to a closed position at upper portion 40 to hide bracket 42 within the interior of camera 36. Coupling device 50 is exposed at the bottom surface of camera 36 to accept a stand screw or other stand member, such as for a tripod. Bottom portion 38 may be held in the closed position by a mechanical lock or magnetic attraction. When an end user desires to couple camera 36 to a display, bottom portion 38 rotates to an open position relative to upper portion 40 to expose bracket 42 at the camera interior. The end user places bracket 42 over the display upper surface and releases bottom portion 38 so that it biases against the display rear surface.

Figure 4:
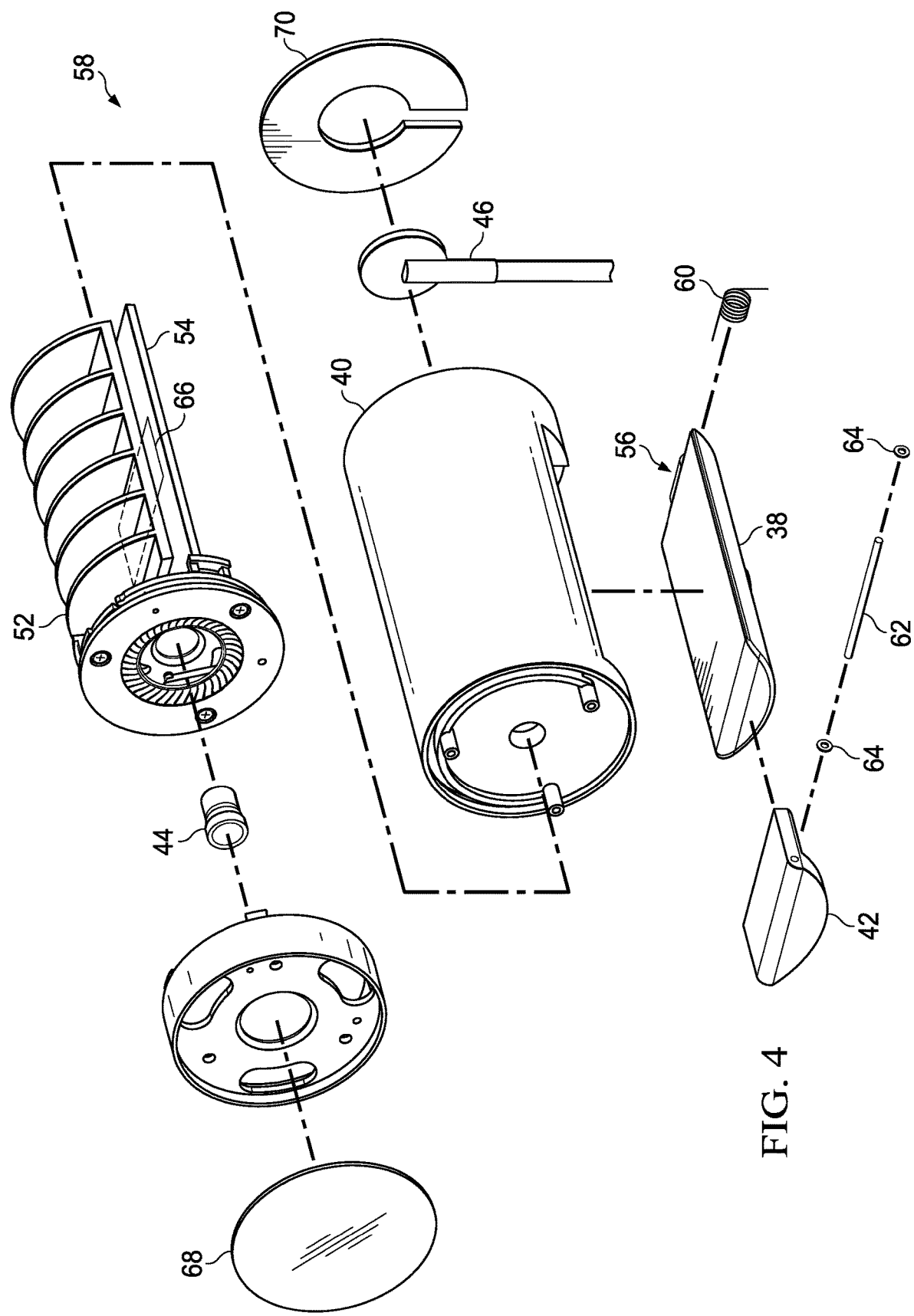
FIG. 4 depicts an exploded view of a peripheral camera in a cylindrical housing having an integrated housing portion bracket.

Referring now to FIG. 4, an exploded view depicts a peripheral camera 36 in a cylindrical housing 58 having an integrated housing portion bracket 42. As described above, cylindrical housing 58 is extruded aluminum having open front and rear faces, as is described in further detail in U.S. patent application Ser. No. 17/325,508, filed May 20, 2021, by Inventors Peng Lip Goh et al., which is incorporated herein as if fully set forth. The extruded aluminum housing 58 is then machined to cut free bottom portion 38 from upper portion 40, such as with a CNC operation. Bottom portion 38 is cut to fit as a door at the bottom of upper portion 40 and rotationally coupled to upper portion 40 with a hinge 56 that integrates a spring 60. In the example embodiment, bottom portion 38 is cut from a central region of upper portion 40 to leave areas of a full circumference in upper portion 40 at each opposing end of housing 58. Hinge 56 couples to upper portion 40 at a full circumference area that provides robust support and spring 60 biases hinge 56 to close bottom portion 38 flush with upper portion 40. Communication port 46 couples to upper portion 40 at the area of increased circumference for a robust coupling to withstand stresses applied through a communication cable. Subassembly 52 couples circuit board 54 having a processing resource 66 within a protected "cage" having an outer circumference that fits into cylindrical housing 58. Camera module 44 couples to the front end of subassembly 52 and interfaces with circuit board 54, which in turn interfaces with communications port 46. Subassembly 52 slides into cylindrical housing 58 as an assembled unit. A cover glass 68 couples over camera module 44 to enclose the front side of cylindrical housing 58, and a rear cover 70 couples to the rear face of cylindrical housing 58 to capture subassembly 52 in place. L-shaped bracket 42 couples to upper portion 40 with an axle 62 that adjusts the orientation of bracket 42 relative to upper portion 40. Friction devices 64, such as Belleville friction washers, couple to axle 62 to resist rotation of bracket 42 so that a selected tilt of the peripheral camera will hold unless an end user changes the tilt with a sufficient pressure.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing and operable to process information;
   a memory disposed in the housing and operable to store the information;
   a peripheral display separate from the housing and interfaced with the processor, the peripheral display operable to present the information as visual images;
   a cylindrical housing having a bottom portion separated from an upper portion;
   a camera module operable to capture visual images;
   a processing resource interfaced with the camera module and operable to manage operations of the camera module;
   a subassembly configured to secure the camera module and the processing resource in an interior of the cylindrical housing at the upper portion; and
   a hinge rotationally coupling the bottom portion to the upper portion at a rear side of the cylindrical housing;
   wherein the cylindrical housing couples to the peripheral display by rotating the lower portion away from the upper portion, resting the upper portion on the peripheral display, and biasing the bottom portion against a rear surface of the peripheral display and;
   wherein the cylindrical housing is extruded from aluminum as a contiguous cylinder and the bottom portion is cut out of the contiguous cylinder.

2. The information handling system of claim 1 further comprising a spring interfaced with the cylindrical housing lower portion and upper portion to bias the lower portion to a closed position at the upper portion.

3. The information handling system of claim 2 wherein the upper portion has a full circumference of the cylindrical housing at front and rear ends and the bottom portion fits between the front and rear ends.

4. The information handling system of claim 3 wherein:
   the camera module is coupled to the cylindrical housing at the upper portion front end within the full circumference; and
   a communication cable extends from the cylindrical housing at the upper portion rear end within the full circumference.

5. The information handling system of claim 4 further comprising a coupling device integrated in the cylindrical housing bottom portion and configured to couple to a stand.

6. The information handling system of claim 1 further comprising a bracket coupled to the cylindrical housing upper portion at a front side, the bracket positioned to have the bottom portion hide the bracket when rotated to a closed position and to engage against the peripheral display when the bottom portion rotates to an open position.

7. The information handling system of claim 6 further comprising:
   an axle coupling the bracket to the cylindrical housing upper portion;
   wherein the bracket rests in a fixed orientation at the peripheral display and the cylindrical housing rotates relative to the bracket to adjust a camera tilt orientation.

8. The information handling system of claim 7 further comprising a friction device interfaced with the axle to resist rotation of the bracket.

9. A method for assembly of a camera, the method comprising:
   extruding a cylinder having an interior;
   cutting a bottom portion from an upper portion of the cylinder;
   rotationally coupling the bottom portion to the upper portion to rotate between an open position and a closed position;
   assembling a camera module into the cylinder interior; and
   rotating the bottom portion to an open position to couple the cylinder to a peripheral display by resting the upper portion on the peripheral display upper surface and biasing the bottom portion against a rear surface of the peripheral display.

10. The method of claim 9 further comprising:
    cutting the bottom portion to leave a full circumference of the cylinder at the upper portion at a front and a rear of the cylinder; and
    integrating the camera module at the front full circumference of the upper portion.

11. The method of claim 10 further comprising:
    integrating a communication port at the rear full circumference of the upper portion;
    coupling the camera module to a subassembly;
    coupling a circuit board to the subassembly and interfaced with the camera module, the circuit board having a processing resource to process visual image information captured by the camera module; and
    interfacing the communication port with the circuit board.

12. The method of claim 10 further comprising:
    coupling a bracket to the upper portion interior at the location of the cutting of the bottom portion; and
    resting the bracket on the peripheral display upper surface to support the cylinder in the open position on the peripheral display.

13. The method of claim 12 further comprising coupling the bracket to the upper portion with an axle, the bracket rotating about the axle relative to the upper portion to adjust tilt of the cylinder relative to the peripheral display upper surface.

14. The method of claim 13 further comprising interfacing the bracket and axle with a friction device that resists rotation of the bracket relative to the upper portion.

15. The method of claim 9 further comprising:
    integrating a coupling device in the bottom portion;
    rotating the bottom portion to a closed position relative to the upper portion; and
    supporting the cylinder on a stand with the coupling device.

16. A camera comprising:
    an extruded aluminum cylinder having been cut to separate a bottom portion from an upper portion;
    a subassembly configured to slide into the upper portion;
    a camera module coupled to the subassembly and operable to capture visual images; and
    a hinge rotationally coupling the upper portion and bottom portion, the bottom portion rotating to an open position to couple the cylinder to a peripheral display upper surface.

17. The camera of claim 16 further comprising a bracket coupled to the upper portion and positioned at a front side interior of the cylinder at the bottom portion to rest on the peripheral display upper surface.

18. The camera of claim 17 further comprising a friction device interfaced with the bracket to resist rotation of the bracket relative to the upper portion.

19. The camera of claim 16 wherein the bottom portion is cut from the cylinder to have a front and rear of the cylinder with a complete circumference, the camera module disposed in the front complete circumference and the rear complete circumference having a communication port to accept a communication cable.

* * * * *